United States Patent
Liu et al.

(10) Patent No.: US 8,159,168 B2
(45) Date of Patent: Apr. 17, 2012

(54) ROTOR POSITION ESTIMATOR FOR AN ELECTRICAL MACHINE

(75) Inventors: Jingbo Liu, Grafton, WI (US); Thomas Nondahl, Wauwatosa, WI (US); Peter B. Schmidt, Franklin, WI (US); Semyon Royak, Beachwood, OH (US); Mark H. Harbaugh, Richfield, OH (US)

(73) Assignee: Rockwell Automation Technologies, Inc., Mayfield, OH (US)

( * ) Notice: Subject to any disclaimer, the term of this patent is extended or adjusted under 35 U.S.C. 154(b) by 504 days.

(21) Appl. No.: 12/474,861

(22) Filed: May 29, 2009

(65) Prior Publication Data

US 2010/0301790 A1   Dec. 2, 2010

(51) Int. Cl.
*H02P 6/00* (2006.01)
*H02P 1/04* (2006.01)

(52) U.S. Cl. ............. 318/400.33; 318/400.32; 318/615; 318/461; 318/806; 318/808; 361/242; 361/240; 700/297; 700/298

(58) Field of Classification Search ............. 318/400.33, 318/400.32, 615, 461, 806, 808, 805; 361/242, 361/240; 700/297, 298
See application file for complete search history.

(56) References Cited

U.S. PATENT DOCUMENTS

| | | | | |
|---|---|---|---|---|
| 5,559,419 A * | 9/1996 | Jansen et al. | ................ | 318/808 |
| 5,565,752 A * | 10/1996 | Jansen et al. | ................ | 318/807 |
| 5,585,709 A * | 12/1996 | Jansen et al. | ................ | 318/807 |
| 6,894,454 B2 * | 5/2005 | Patel et al. | ................ | 318/700 |
| 7,443,130 B2 * | 10/2008 | Takao et al. | ................ | 318/806 |

OTHER PUBLICATIONS

Corely, Mathew J. et al.; "Rotor Position and Velocity Estimation for a Salient-Pole Permanent Magnet Synchronous Machine at Standstill and High Speeds"; IEE Transactions on Industry Applications, pp. 784-789, vol. 34, No. 4, Jul./Aug. 1998.
Silva, Cesar, et al.; Hybrid Rotor Position Observer for Wide Speed-Range Sensorless PM Motor Drives Including Zero Speed; IEEE Transactions on Industrial Electronics, pp. 373-378, vol. 53, No. 2, Apr. 2006.

* cited by examiner

*Primary Examiner* — Rita Leykin
(74) *Attorney, Agent, or Firm* — Fletcher Yoder, P.C.; Alexander R. Kuszewski; John M. Miller

(57) ABSTRACT

A method for estimating a rotor position in an electrical machine is provided. The method is applicable to electrical machines that have magnetic saliency. The method includes extracting the rotor position from a demodulated output signal generated in response to an injected high frequency carrier signal and determining a position error compensation based upon a demodulation delay and a velocity or rotational frequency of the electrical machine. The method also includes estimating the rotor position by applying the position error compensation to the extracted rotor position.

20 Claims, 4 Drawing Sheets

ROTOR POSITION ESTIMATOR FOR AN ELECTRICAL MACHINE

BACKGROUND

The invention relates generally to electrical machines of synchronous and asynchronous designs, and particularly to a rotor position estimator for a permanent magnet motor.

Interior permanent Magnet (IPM) synchronous motors have attracted attention in recent years, and are used in many industrial applications. For example, IPM machines are employed for powering high torque applications such as elevators, cranes, and machine tools. Furthermore, such machines may also be employed for conventional loads such as continuous-duty fans, pumps, and compressors. Typically, rotor position and speed information is required for motion and field-oriented control of permanent magnet motors.

Some synchronous motor drive systems employ position sensors such as resolvers and Hall effect sensors coupled to a rotor shaft of the motor to provide such information. However, these sensors add cost and weight, and may reduce the reliability of such systems. Further, use of such sensors may also result in increased maintenance requirements and need of shaft extension and mounting arrangements.

Certain other systems derive the position of the rotor based upon magnetic saliency of the rotor using an injected signal at a high frequency. Typically, such systems employ digital filters to process output signals generated in response to the injected signal. However, this may result in position errors due to undesirable propagation delays of the filters, thereby providing a time-delayed estimation of the rotor position.

In certain systems, a predefined torque related lookup table is utilized to provide a position correction term to compensate for the error in the estimated position. However, this compensation technique may require the designers to generate a lookup table that relates position error to the load current, and may require calibration based upon motor characteristics. Moreover, such techniques may result in a complex and inaccurate compensation for the position estimation error.

Accordingly, it would be desirable to develop a technique to provide an accurate estimation of rotor position in a sensorless motor drive system that uses high frequency injection for position estimation.

BRIEF DESCRIPTION

Briefly, according to one embodiment of the present invention, a method for estimating a rotor position in an electrical machine is provided. The method includes extracting the rotor position from a demodulated output signal generated in response to an injected high frequency carrier signal, and determining a position error compensation based upon a demodulation delay and a velocity or rotational frequency of the electrical machine. The method also includes estimating the rotor position by applying the position error compensation to the extracted rotor position.

In accordance with another aspect, a rotor position estimator for an electrical machine is provided. The rotor position estimator includes a motor drive configured to produce a high frequency carrier signal, and to inject the signal into the motor and a demodulator configured to process an output signal generated in response to the injected high frequency carrier signal, and to extract a rotor position from the output signal. The rotor position estimator also includes a position error compensator configured to determine a position error compensation based upon a demodulation delay of the demodulator and a velocity or rotational frequency of the electrical machine, and to apply the position error compensation to the extracted rotor position.

In accordance with another aspect, a motor drive system is provided. The motor drive system includes a permanent magnet motor having a stator and a rotor and an inverter configured to provide power to the permanent magnet motor, and to inject a high frequency carrier signal into the motor. The motor drive system also includes a demodulator configured to process an output signal generated in response to the injected high frequency carrier signal, and to extract a rotor position from the output signal. Further, the motor drive system also includes a position error compensator configured to determine a position error compensation based upon a demodulation delay of the demodulator and a velocity or rotational frequency of the permanent magnet motor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique function to provide a rotor position estimator for estimating rotor position of an electrical machine such as a permanent magnet motor. In particular, the present technique utilizes an injected signal to extract position estimates of the rotor and applies a position error compensation to the extracted position to estimate the correct rotor position.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
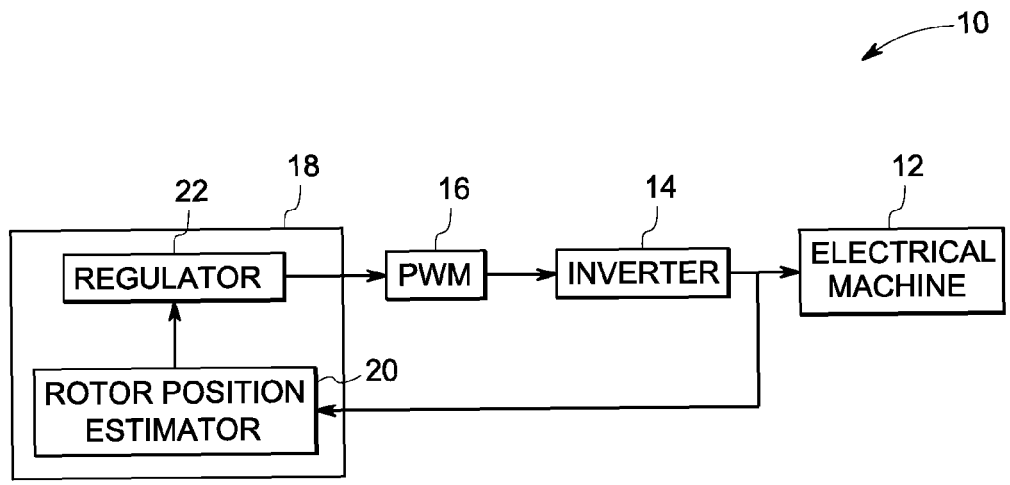
FIG. 1 illustrates a motor drive system in accordance with aspects of the present technique.

Turning now to drawings and referring first to FIG. 1, a motor drive system 10 is illustrated. The motor drive system 10 includes an electrical machine 12, such as a motor or a generator, having a stator and a rotor of a configuration generally known in the art. The motor drive system 10 also includes a power supply such as an inverter 14 coupled to the electrical machine 12 and configured to provide power to the electrical machine 12 at a desired fundamental (drive) frequency. Inverters for such machines are well known and may be constructed in various ways, depending on the requirements for driving the electrical machine 12.

In the illustrated embodiment, the inverter 14 is also configured to inject a high frequency carrier signal into the stator of the electrical machine 12. By injecting the high frequency carrier signal to the stator and measuring an output current, the rotor position can be estimated using signal conditioning and processing described in a greater detail below. The frequency of the carrier signal is selected such that it does not substantially affect the performance of the motor 12. In one exemplary embodiment, a frequency of the carrier signal is between about 200 Hz to about 1000 Hz.

In the illustrated embodiment, the injected high frequency carrier signal deviates from the fundamental frequency and generates an output signal that includes information on the rotor position. In one exemplary embodiment, the high frequency carrier signal is a voltage excitation. In an alternate embodiment, the high frequency carrier signal is a current excitation. The introduction of the high frequency carrier signal can be achieved and controlled in various ways. In this exemplary embodiment, a pulse width modulator 16 may be employed to control the high frequency carrier signal.

The motor drive system 10 further includes a controller 18 to control the inverter 14. The controller 18 receives inputs such as current feedback signals and voltage feedback signals from the electrical machine 12, and generates voltage command signals for the pulse width modulator 16 based upon such inputs. In the illustrated embodiment, the motor drive system 10 includes a rotor position estimator 20 to estimate the rotor position from the output signal generated in response to the injected high frequency carrier signal. In a presently contemplated configuration, the rotor estimator extracts the rotor position from the output signal and applies a position error compensation to the extracted rotor position to estimate a corrected rotor position, which will be described in a greater detail below. In the illustrated embodiment, the controller 18 also includes a regulator 22 that inputs commands such as velocity, torque or voltage and compares the command to a feedback signal or signals to generate commands for the pulse width modulator 16.

Figure 2:
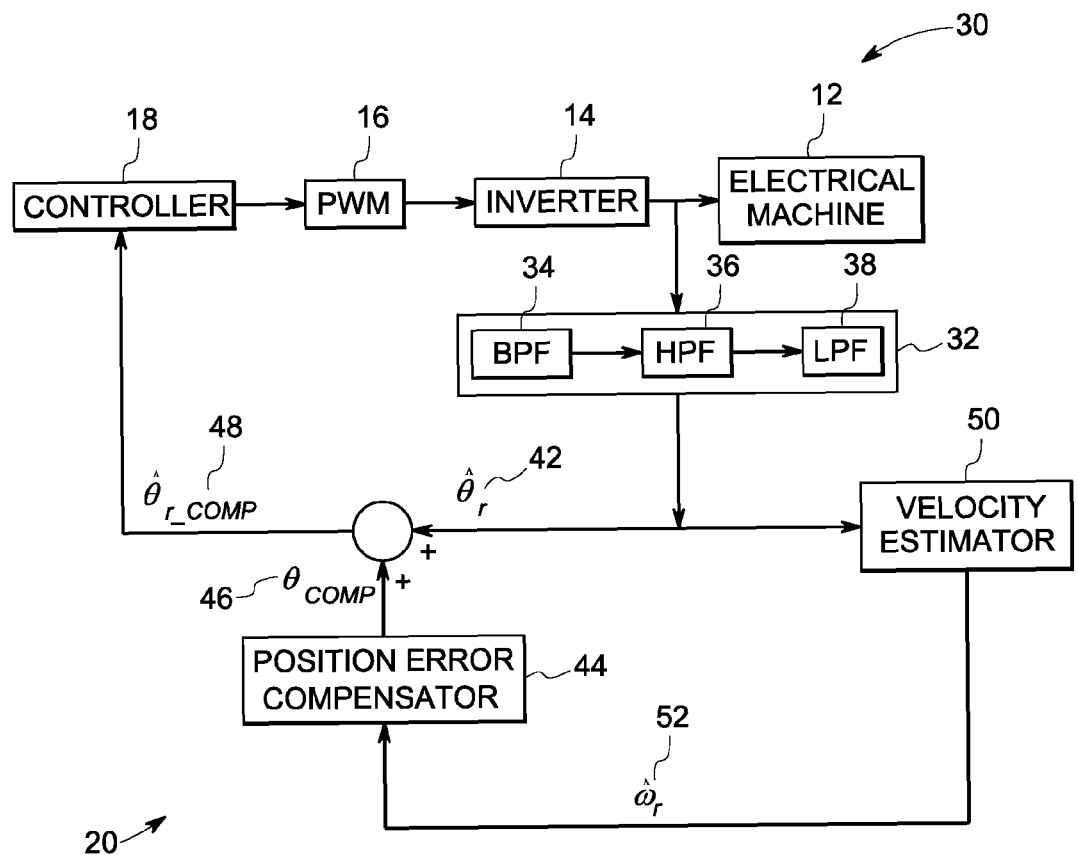
FIG. 2 illustrates an exemplary configuration of the motor drive system of FIG. 1 in accordance with aspects of the present technique.

FIG. 2 illustrates an exemplary configuration 30 of the motor drive system 10 of FIG. 1 in accordance with aspects of the present technique. In a presently contemplated configuration, the rotor position estimator 20 includes a demodulator 32 configured to process the output signal generated in response to the injected high frequency carrier signal and to extract rotor position from the output signal. The demodulator 32 may include a plurality of digital filters to process the output signal. In the illustrated embodiment, the demodulator 32 includes a band-pass filter 34, a high-pass filter 36 and a low-pass filter 38 to process the output signal. However, a variety of other configurations may be envisaged for the demodulator 32. In the illustrated embodiment, the rotor position estimator 20 is configured to extract the rotor position 42 from the output signal.

Moreover, the motor drive system 30 includes a position error compensator 44 configured to determine a position error compensation 46 based upon a demodulation delay of the demodulator 32 and a rotor velocity 52 estimated by a velocity estimator 50. In this exemplary embodiment, the demodulation delay is based upon a filter delay of each of the band-pass, high-pass and low-pass filters 34, 36 and 38. The position error compensation 46 is added to the extracted rotor position 42 to estimate a corrected rotor position 48. It should be noted that applying the position error compensation to the extracted rotor position substantially reduces the position error introduced due to the propagation delay of each of the plurality of digital filters such as the band-pass, high-pass and low-pass filters 34, 36 and 38 thereby providing a substantially accurate estimate of the rotor position. The rotor position estimate 48 may then be provided to the controller 18 for generating the signals for operating the inverter 14.

Figure 3:
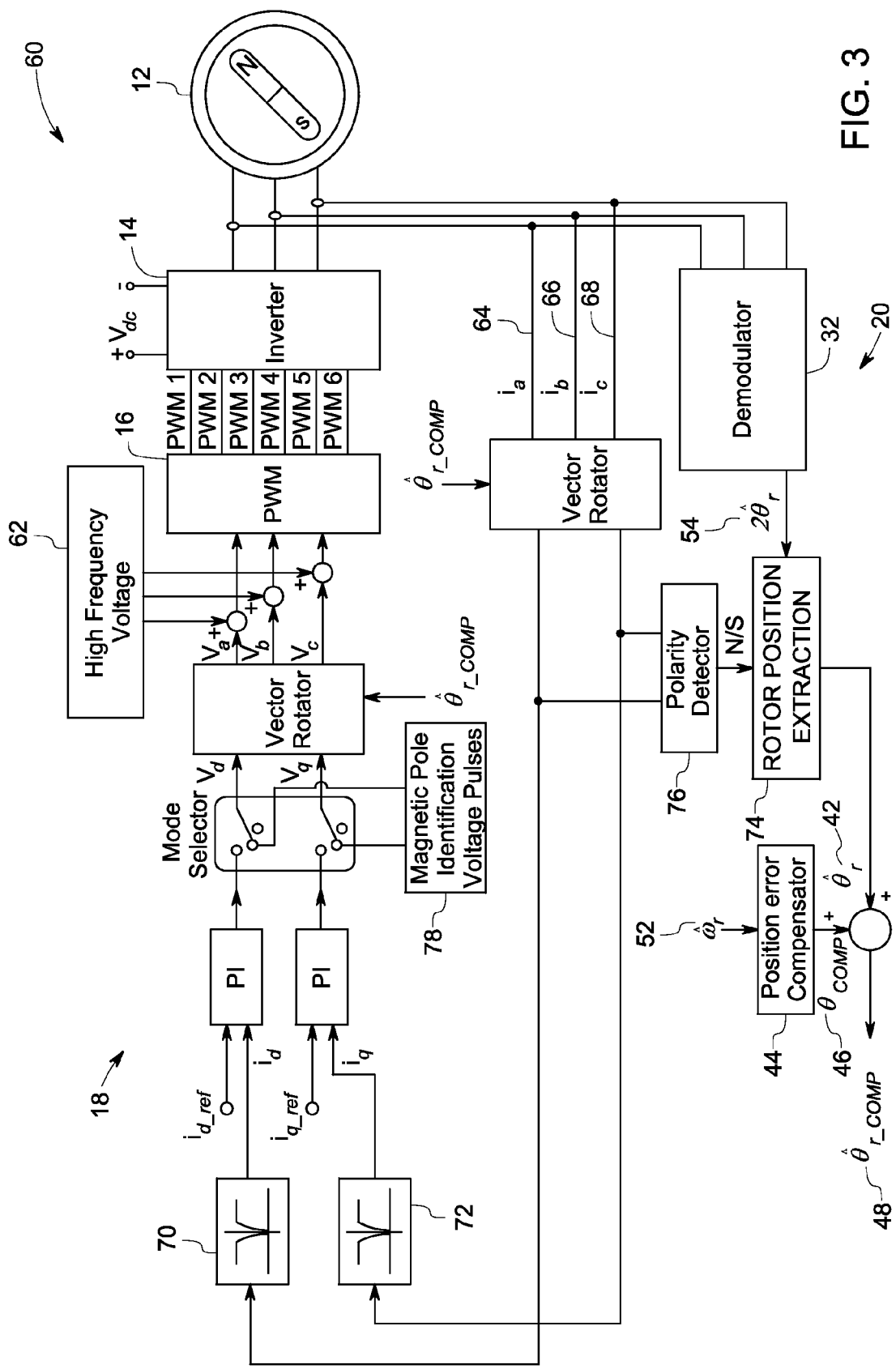
FIG. 3 illustrates an exemplary configuration of the motor drive system having the rotor position estimator of FIG. 2.

FIG. 3 illustrates an exemplary configuration 60 of the motor drive system 30 having the rotor position estimator 20 of FIG. 2. As illustrated, the motor drive system 60 includes the inverter 14 and the pulse width modulator 16 to inject the high frequency carrier signal in the motor 12. The carrier signal excitation can either be voltage excitation or current excitation. In the illustrated embodiment, voltage excitation is employed for the rotor position estimation. As illustrated, a high frequency voltage 62 is applied to the motor 12 and response current signals such as represented by reference numerals 64, 66 and 68 generated in response to the high frequency voltage signal are processed to estimate the rotor position.

As described above, the inverter 14 may be controlled via the controller 18 based upon certain input parameters. In a presently contemplated configuration, the controller 18 includes notch filters such as represented by reference numerals 70 and 72 to filter current feedbacks 64, 66 and 68 from the motor 12 to remove undesirable high frequency current components at the injected frequency.

In the illustrated embodiment, the motor drive system 60 includes the rotor position estimator 20 to estimate the rotor position of the motor 12. The rotor position estimator 20 includes the demodulator 32 configured to process the output signals 64, 66 and 68 generated in response to the injected high frequency carrier signal 62 and to extract a twice frequency rotor position signal (as represented by reference numeral 54) from the output signals 64, 66 and 68. Further, the motor drive system 60 includes a polarity detector 76 configured to determine a polarity of magnets for estimation of the rotor position. In the illustrated embodiment, the polarity detector 76 determines the polarity of the magnets using magnetic pole identification voltage pulses 78 injected into the motor 12. The magnetic polarity is determined by detecting magnitude of the resulting current. As will be appreciated by one skilled in the art a variety of other techniques may be employed to determine the magnetic polarity.

As described before, the rotor position estimator 20 also includes the position error compensator 44 to determine the position error compensation 46 based upon the demodulation delay of the demodulator 32 and the velocity or rotational frequency 52 of the motor 12. In certain embodiments, the demodulator 32 includes a plurality of digital filters (not shown) and the demodulation delay is based upon a filter delay of each of the plurality of digital filters. In certain embodiments, the demodulator 32 includes a band-pass filter, or a high-pass filter, or a low-pass filter, or combinations thereof. As will be appreciated by one skilled in the art a variety of configurations including a number of digital filters may be envisaged for the demodulator 32.

In certain embodiments, the filter delay of each of the plurality of digital filters is determined based upon design parameters of the filter and an injection frequency of the injected high frequency carrier signal. It should be noted that the position error compensation substantially reduces a position error introduced due to the propagation delay of each of the plurality of digital filters. In operation, the rotor position estimator 20 estimates the rotor position 48 based upon the extracted rotor position 42 and the position error compensation 46.

Figure 4:
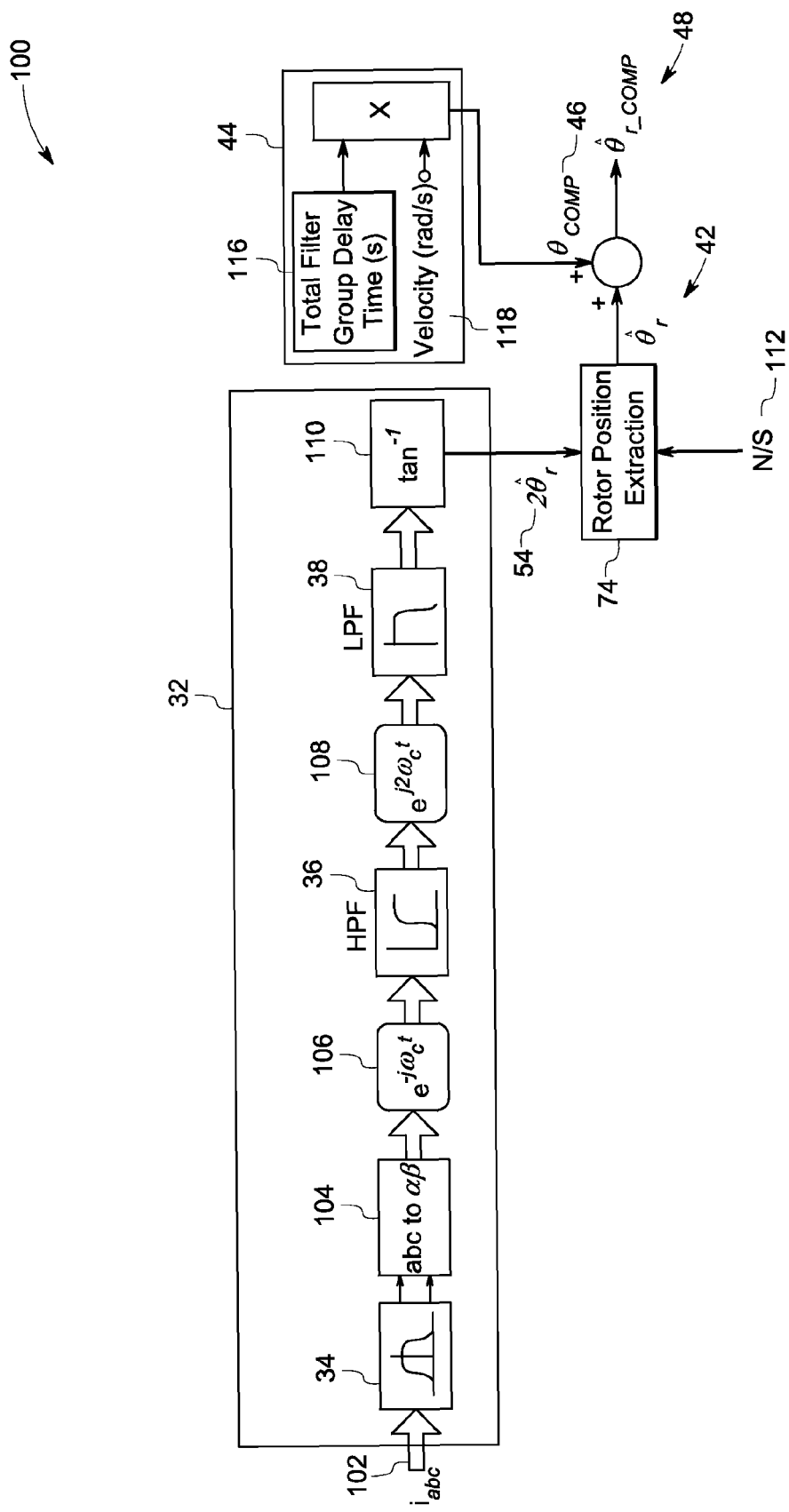
FIG. 4 illustrates an exemplary rotor position estimator with the demodulator and the position error compensator of FIG. 2.

FIG. 4 illustrates an exemplary rotor position estimator 100 with the demodulator 32 and the position error compensator 44 of FIG. 2. As described above, a high frequency carrier signal is injected into the motor 12 (see FIG. 3) and an output signal generated in response to the high frequency carrier signal is processed using the signal demodulator 32 to extract the rotor position information. In this exemplary embodiment, a rotating high frequency voltage vector in the stationary frame is injected. The rotating high frequency voltage vector may be represented by the following equation:

$$\begin{bmatrix} u_{\alpha c} \\ u_{\beta c} \end{bmatrix} = \begin{bmatrix} -u_c \sin(\omega_c t) \\ u_c \cos(\omega_c t) \end{bmatrix} \quad (1)$$

$$\text{i.e. } \vec{u}_c^{\alpha\beta} = u_{\alpha c} + j u_{\beta c} = j \cdot u_c \cdot e^{j\omega_c t} \quad (2)$$

Where: $u_c$ is the magnitude of the high frequency voltage vector; and $\omega_c$ is the frequency of the high frequency voltage vector. Furthermore, the high frequency voltage vector in a synchronous rotating reference frame (d-q reference frame) is represented by the following equation:

$$\vec{u}_c^{dq} = \vec{u}_c^{\alpha\beta} \cdot e^{-j\omega_r t} = j \cdot u_c \cdot e^{j(\omega_c - \omega_r)t} \quad (3)$$

In this exemplary embodiment, the injected frequency is greater than the fundamental frequency ($\omega_c \gg \omega_r$) hence any speed voltage induced at the rotor frequency is neglected. In addition, the stator resistance can also be neglected because $\omega_c \cdot L \gg R_s$. According to the conventional PM machine model in the d-q reference frame, we obtain:

$$\vec{u}_c^{dq} \approx L_{dq} \frac{d\vec{i}_s^{dq}}{dt} \quad (4)$$

Where:

$$\vec{i}_s^{dq}$$

is the stator current vector in the d-q reference frame; and $$L_{dq} = \begin{bmatrix} L_d & 0 \\ 0 & L_q \end{bmatrix} \quad (5)$$

As can be seen from equations 3 and 4 above:

$$\frac{d\vec{i}_s^{dq}}{dt} = L_{dq}^{-1} \cdot \vec{u}_c^{dq} = \frac{j \cdot u_c}{L_q \cdot L_d} \begin{bmatrix} L_q & 0 \\ 0 & L_d \end{bmatrix} \cdot e^{j(\omega_c - \omega_r)t} \quad (6)$$

Moreover, $$\vec{i}_s^{dq}$$

can be represented by the following equation:

$$\vec{i}_s^{dq} = \frac{u_c}{L_q \cdot L_d \cdot (\omega_c - \omega_r)} \cdot \begin{bmatrix} \frac{L_q + L_d}{2} e^{j(\omega_c - \omega_r)t} + \\ \frac{L_q - L_d}{2} e^{-j(\omega_c - \omega_r)t} \end{bmatrix} \quad (7)$$

The stator currents in the stationary reference frame could be further obtained as follows:

$$\vec{i}_s^{\alpha\beta} = \vec{i}_s^{dq} \cdot e^{j\omega_r t} = \frac{u_c}{L_q \cdot L_d \cdot (\omega_c - \omega_r)} \cdot \begin{bmatrix} \frac{L_q + L_d}{2} e^{j\omega_c t} + \\ \frac{L_q - L_d}{2} e^{j(2\omega_r - \omega_c)t} \end{bmatrix} \quad (8)$$

Thus, as can be seen from equation 8, the resulting stator current vector in the stationary reference frame due to the injected high frequency voltage contains two components. The first component is a positive sequence current which may be represented by the following equation:

$$\vec{i}_{cp} = I_{cp} e^{j\omega_c t} = \frac{u_c}{L_q \cdot L_d \cdot (\omega_c - \omega_r)} \cdot \frac{L_q + L_d}{2} e^{j\omega_c t} \quad (9)$$

Further, the second component is a negative sequence current which may be represented by the following equation:

$$\vec{i}_{cn} = I_{cn} e^{j(2\omega_r - \omega_c)t} = \frac{u_c}{L_q \cdot L_d \cdot (\omega_c - \omega_r)} \cdot \frac{L_q - L_d}{2} e^{j(2\omega_r - \omega_c)t} \quad (10)$$

As described above, considering $\omega_c \gg \omega_r$, above equations could be simplified as follows:

$$\vec{i}_{cp} \approx \frac{u_c \cdot (L_q + L_d)}{2 L_q L_d \omega_c} e^{j\omega_c t} \quad (11)$$

and $$\vec{i}_{cn} \approx \frac{u_c \cdot (L_q - L_d)}{2 L_q L_d \omega_c} e^{j(2\omega_r - \omega_c)t} \quad (12)$$

As can be seen, the negative sequence component of the output stator current vector contains rotor position information. In this exemplary embodiment, the output stator current vector is processed using the demodulator 32 to extract the rotor position. Again in the exemplary embodiment illustrated, the demodulator 32 includes the band-pass filter 34 to extract the high frequency component from an input current signal ($^i$abc) 102. The high frequency component may be extracted using the band-pass filter 34 centered at $\omega_r$.

Further, the high-pass filter 36 removes the positive sequence components and the low-pass filter 38 removes components other than the negative sequence component to extract the rotor position. In this embodiment, the high frequency current vector 102 is transformed to a α-β reference frame, as represented by reference numeral 104.

Further, to eliminate the positive sequence component, a vector rotator $e^{-j\omega_c t}$ 106 is applied to transform the variables into a rotating reference frame synchronized with the positive sequence component. The stator current vector after the vector rotation can be represented by the following equation:

$$\vec{i}_s^{\alpha\beta 1} = \vec{i}_s^{\alpha\beta} \cdot e^{-j\omega_c t} = I_{cp} + I_{cn} e^{j2(\omega_r - \omega_c)t} \quad (12)$$

As can be seen, the positive sequence component is transformed to a DC component $I_{cp}$. The DC component $I_{cp}$ is subsequently removed through the cascaded high-pass filter

36. Similarly, via another cascaded vector rotator $e^{j2\omega_c t}$ 108, which is rotating in the same direction as the negative sequence component with twice the carrier frequency, we obtain:

$$\bar{i}_s^{\alpha\beta3} = I_{cn} e^{j2(\omega_r - \omega_c)t} \cdot e^{j2\omega_c t} = I_{cn} e^{j2\omega_r t} \quad (13)$$

Again, through another cascaded low-pass filter 38, the stator current vector containing the saliency position information is $$\bar{i}_s^{\alpha\beta\_dem}$$

obtained as:

$$\begin{bmatrix} i_{\alpha\_dem} \\ i_{\beta\_dem} \end{bmatrix} \approx \begin{bmatrix} I_{cn} \cos(2\theta_r) \\ I_{cn} \sin(2\theta_r) \end{bmatrix} \quad (14)$$

In the illustrated embodiment, the extraction of the angle $2\hat{\theta}_r$ is done by direct $\tan^{-1}$ calculation, as represented by reference numeral 110. Thus, the angle $2\hat{\theta}_r$ may be estimated as:

$$2\hat{\theta}_r = \arctan\left(\frac{i_\beta^{dem}}{i_\alpha^{dem}}\right) \quad (15)$$

The rotor position is extracted using the above equation along with a magnetic polarity 112 of the rotor, as represented by reference numeral 74. As described above, the polarity detector 76 (see FIG. 3) may be employed to determined the polarity 112 of the rotor based upon output current signals generated in response to injected magnetic pole identification voltage pulses 78 (see FIG. 3) into the motor 12 (see FIG. 3).

Once the rotor position ($\hat{\theta}_r$) 42 is extracted, the position error compensation ($\theta_{COMP}$) 46 is applied to the extracted rotor position 42 to estimate the corrected rotor position ($\hat{\theta}_{r\_COMP}$) 48. In the illustrated embodiment, the position error compensation 46 is determined based upon a total filter group delay time 116 of the demodulator 32 and a velocity 118 of the motor 12. The total filter group delay time 116 is calculated using the filter group delay of each of the band-pass filter 34, high-pass filter 36 and low-pass filter 38. Advantageously, the position error compensation 46 substantially reduces any error in the extracted rotor position 42 caused due to the use of the filters 34, 36 and 38.

As used herein, the term "group delay" refers to a measure of the propagation time delay of a signal passing through the filter as a function of frequency. The filter group delay may be calculated as the negative first derivative of the filter's phase response and is represented by the following equation:

$$D(\omega) = -\frac{d\theta(\omega)}{d\omega} \quad (16)$$

The filter group delay is typically inversely proportional to filter bandwidth. Tables or plots of group delay as a function of frequency can be found in many filter design handbooks and software programs. As an example, if the filter 34 is a two-pole IIR Butterworth with a center frequency of 250 Hz and a bandwidth of 50 Hz, the group delay is 6.3 ms for a 250 Hz signal.

The position error compensation technique described above automatically compensates for the position error caused by the signal propagation time according to the machine speed. Advantageously, this on-line compensation technique does not need any offline determination of lookup tables and automatically compensates for the position error according to the machine speed. Once the filters and injection frequency are designed, the filter group delay time would be a fixed constant value according to the designed digital filters and may be utilized to determine the position error compensation.

Figure 5:
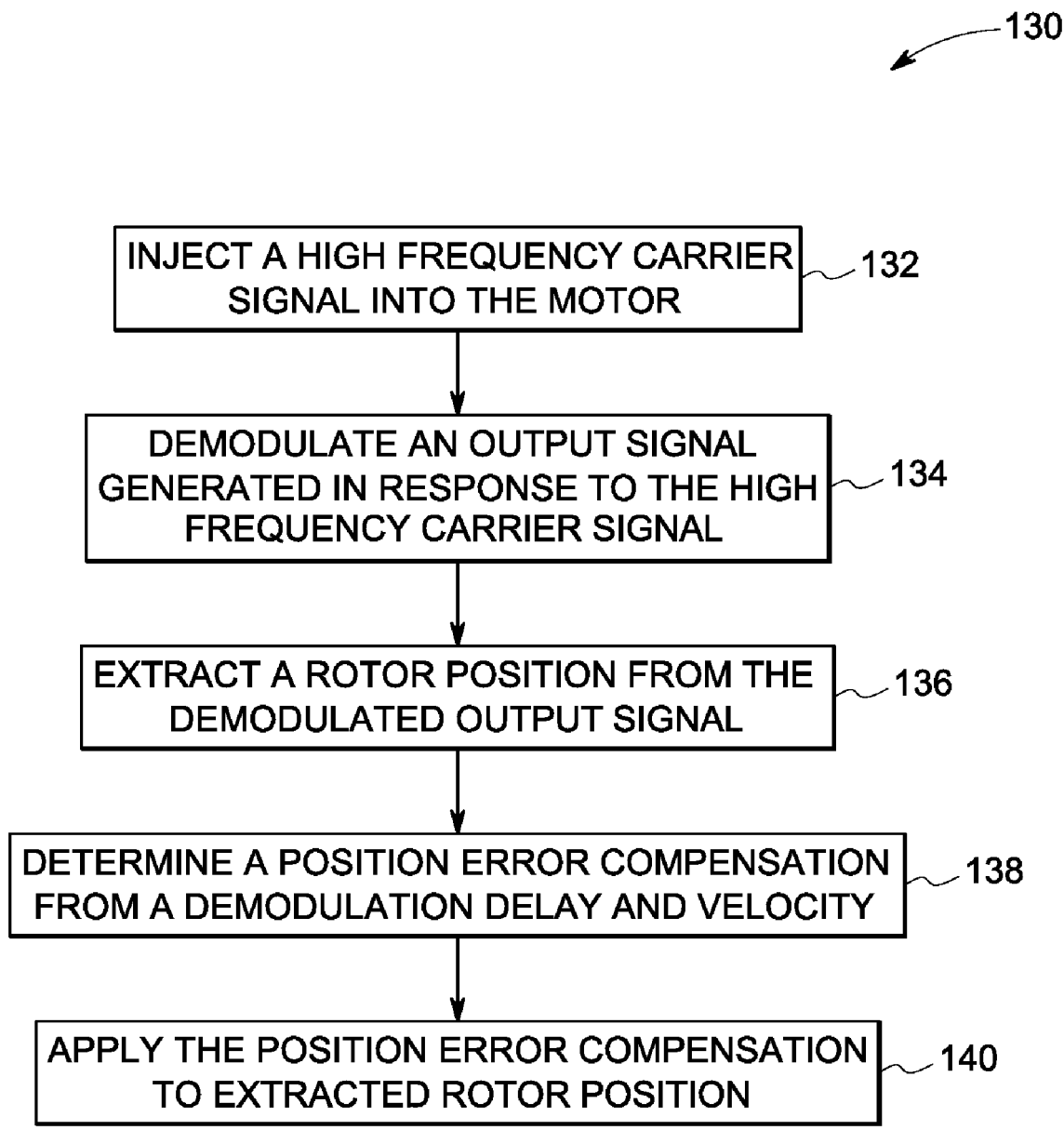
FIG. 5 is a flow chart illustrating an exemplary method of estimating the rotor position in a motor in accordance with aspects of the present technique.

FIG. 5 is a flow chart illustrating an exemplary method 130 of estimating the rotor position of a motor in accordance with aspects of the present technique. At step 132, a high frequency carrier signal is injected into the motor. The high frequency carrier signal may be a voltage or a current excitation. In this exemplary embodiment, high frequency carrier voltage signals are applied to the stator of the motor. Such signals produce output current signals that vary with rotor position. The output signals generated in response to the high frequency carrier voltage signals are then processed using a demodulator having a plurality of digital filters (step 134).

In this exemplary embodiment, the output signals are processed to remove the fundamental and positive sequence current component of the output signal. Further, the negative sequence current component is processed to extract the rotor position information (step 136). In certain embodiments, a plurality of digital filters such as a band-pass filter, a high-pass filter and a low-pass filter may be employed to extract the rotor position information from the output signals.

At step 138, a position error compensation is determined. The position error compensation is based upon a demodulation delay of the demodulator and a velocity of the motor, or the rotational frequency which, as those skilled in the art will recognize is related to the velocity by the number of poles of the motor. In this embodiment, the demodulation delay includes a filter delay of each of the plurality of digital filters employed for the demodulation of the output signals. Further, the position error compensation is applied to the extracted rotor position to estimate a corrected rotor position of the rotor (step 140). The position error compensation substantially reduces an error introduced due to the propagation delays of each of the plurality of digital filters.

As will be appreciated by those of ordinary skill in the art, the foregoing example, demonstrations, and process steps may be implemented by suitable code on a processor-based system. It should also be noted that different implementations of the present technique may perform some or all of the steps described herein in different orders or substantially concurrently, that is, in parallel. Furthermore, the functions may be implemented in a variety of programming languages, such as C++ or JAVA. Such code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code.

The various aspects of the structures and methods described hereinabove have utility in motor drive systems, used in various applications. As described above, the technique utilizes a high frequency carrier signal injection to extract information related to the rotor position in the motor and compensates any position error introduced due to filters employed for processing an output signal. Such position error compensation is estimated based upon the velocity or rotational frequency of the motor and a demodulation delay of the filters. Advantageously, the technique described above provides an on-line accurate estimate of rotor position in a permanent magnet motor without the need of a calibration procedure. With suitable modifications the technique could also be applied to other types of synchronous motors or to induction motors.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for estimating a rotor position in an electrical machine, comprising:
   extracting the rotor position from a demodulated output signal generated in response to an injected high frequency carrier signal;
   determining a position error compensation based upon a demodulation delay and a velocity or rotational frequency of the electrical machine; and
   estimating the rotor position by applying the position error compensation to the extracted rotor position.

2. The method of claim 1, wherein determining the position error compensation comprises calculating the demodulation delay based upon a filter delay of each of a plurality of digital filters employed for generating the demodulated output signal.

3. The method of claim 2, wherein calculating the demodulation delay comprises calculating the filter delay of each of a band-pass digital filter, a high-pass digital filter and a low-pass digital filter.

4. The method of claim 3, wherein the filter delay is determined based upon parameters of the filter and an injection frequency of the injected high frequency carrier signal.

5. The method of claim 3, comprising processing positive and negative sequence current components of the output signal using the high-pass and low-pass digital filters respectively to generate a signal containing rotor position information.

6. The method of claim 1, wherein the electrical machine is a permanent magnet synchronous motor.

7. The method of claim 6, further comprising determining a polarity of the rotor magnets from output current signals generated in response to injected voltage pulses into the motor.

8. A rotor position estimator for an electrical machine, comprising:
   a motor drive configured to produce a high frequency carrier signal and to inject the signal into the electrical machine;
   a demodulator configured to process an output signal generated in response to the injected high frequency carrier signal and to extract a rotor position from the output signal;
   a position error compensator configured to determine a position error compensation based upon a demodulation delay of the demodulator and a velocity or rotational frequency of the electrical machine and to apply the position error compensation to the extracted rotor position.

9. The rotor position estimator of claim 8, further comprising a signal generator to generate the high frequency carrier signal.

10. The rotor position estimator of claim 8, wherein the demodulator comprises a band-pass digital filter, a high-pass digital filter and a low-pass digital filter to process the output signal to extract the rotor position.

11. The rotor position estimator of claim 10, wherein the position error compensator is configured to substantially reduce a position error introduced due to propagation time delays of each of the band-pass, high-pass and low-pass digital filters.

12. The rotor position estimator of claim 10, wherein the high-pass and low-pass digital filters are configured to process positive and negative sequence current components of the output signal respectively to generate a signal containing rotor position information.

13. The rotor position estimator of claim 10, wherein the demodulation delay of the demodulator is based upon individual filter delays of each of the band-pass, high-pass and low-pass digital filters.

14. The rotor position estimator of claim 8, wherein an injection frequency of the high frequency carrier signal is between about 200 Hz to about 1000 Hz.

15. The rotor position estimator of claim 8, wherein the rotor position estimator further comprises a polarity detector configured to determine a polarity of the rotor magnets for estimation of the rotor position.

16. A motor drive system, comprising:
   an electrical machine having a stator and a rotor;
   an inverter configured to provide power to the electrical machine and to inject a high frequency carrier signal into the electrical machine;
   a demodulator configured to process an output signal generated in response to the injected high frequency carrier signal and to extract a rotor position from the output signal;
   a position error compensator configured to determine a position error compensation based upon a demodulation delay of the demodulator and a velocity or rotational frequency of the electrical machine.

17. The motor drive system of claim 16, wherein the system further comprises a processor configured to estimate the rotor position based upon the extracted rotor position and the position error compensation.

18. The motor drive system of claim 17, wherein the processor further comprises a polarity detector configured to determine a polarity of the rotor magnets for estimation of the rotor position.

19. The motor drive system of claim 16, wherein the demodulator comprises a plurality of digital filters and the demodulation delay is based upon a filter delay of each of a plurality of digital filters.

20. The motor drive system of claim 19, wherein the demodulator comprises a band-pass filter, or a high-pass filter, or a low-pass filter, or combinations thereof.

* * * * *